Aug. 28, 1956   H. L. RICHARDSON   2,761,003
APPARATUS FOR REMOVING GASES FROM AN ARC FURNACE
Filed April 9, 1954   6 Sheets-Sheet 1
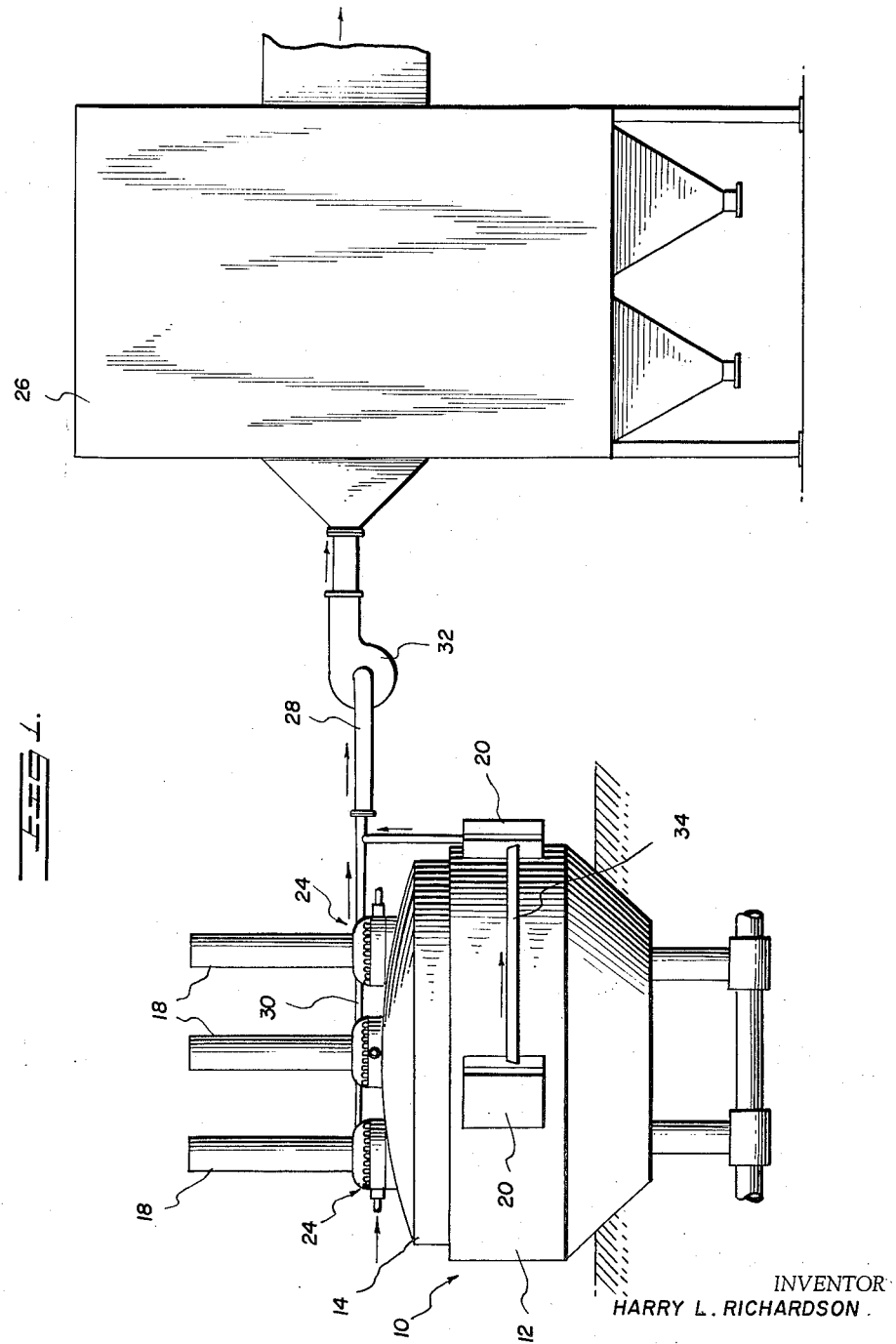
INVENTOR
HARRY L. RICHARDSON.
BY *Harold T. Stowell*
ATTORNEY

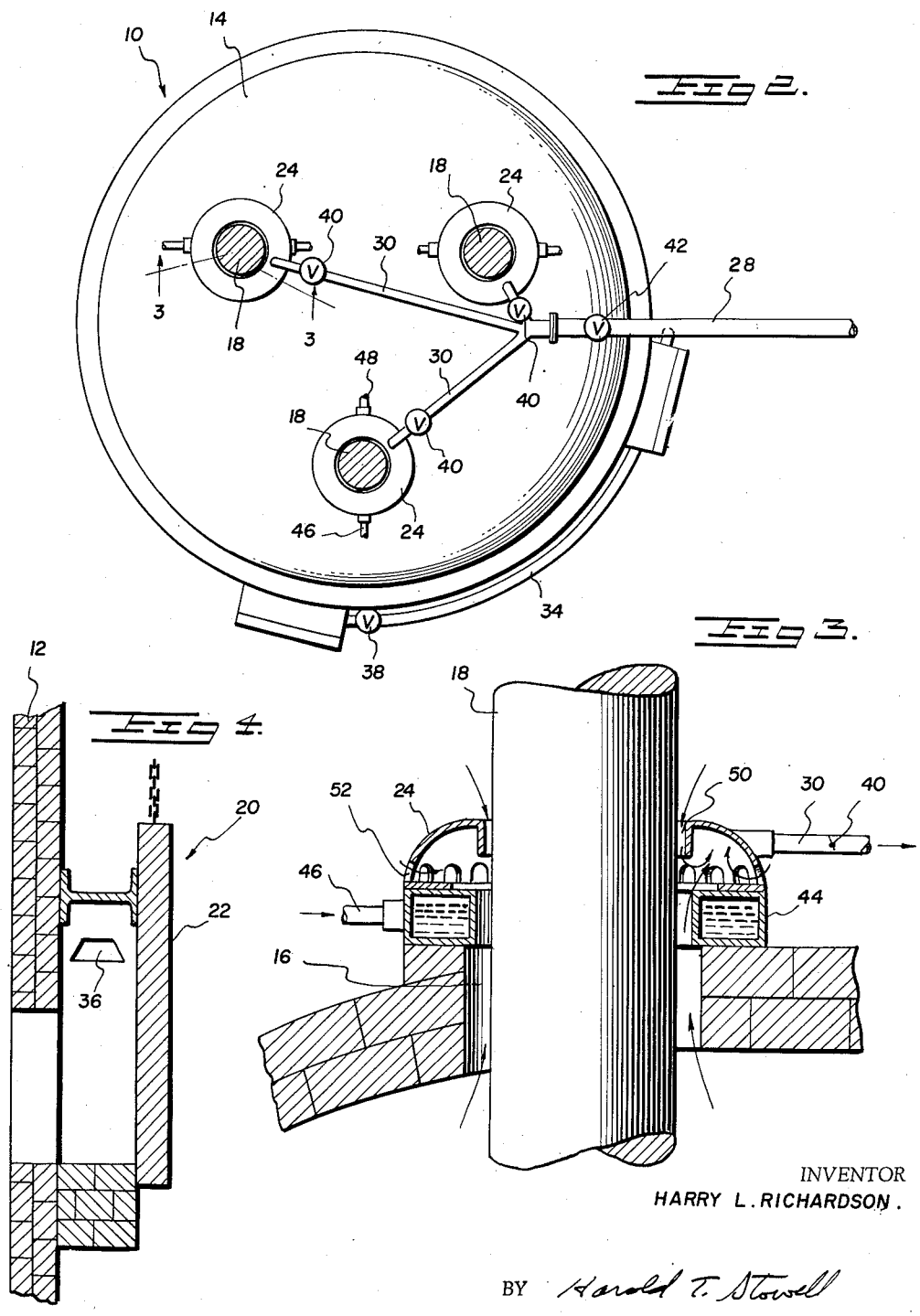

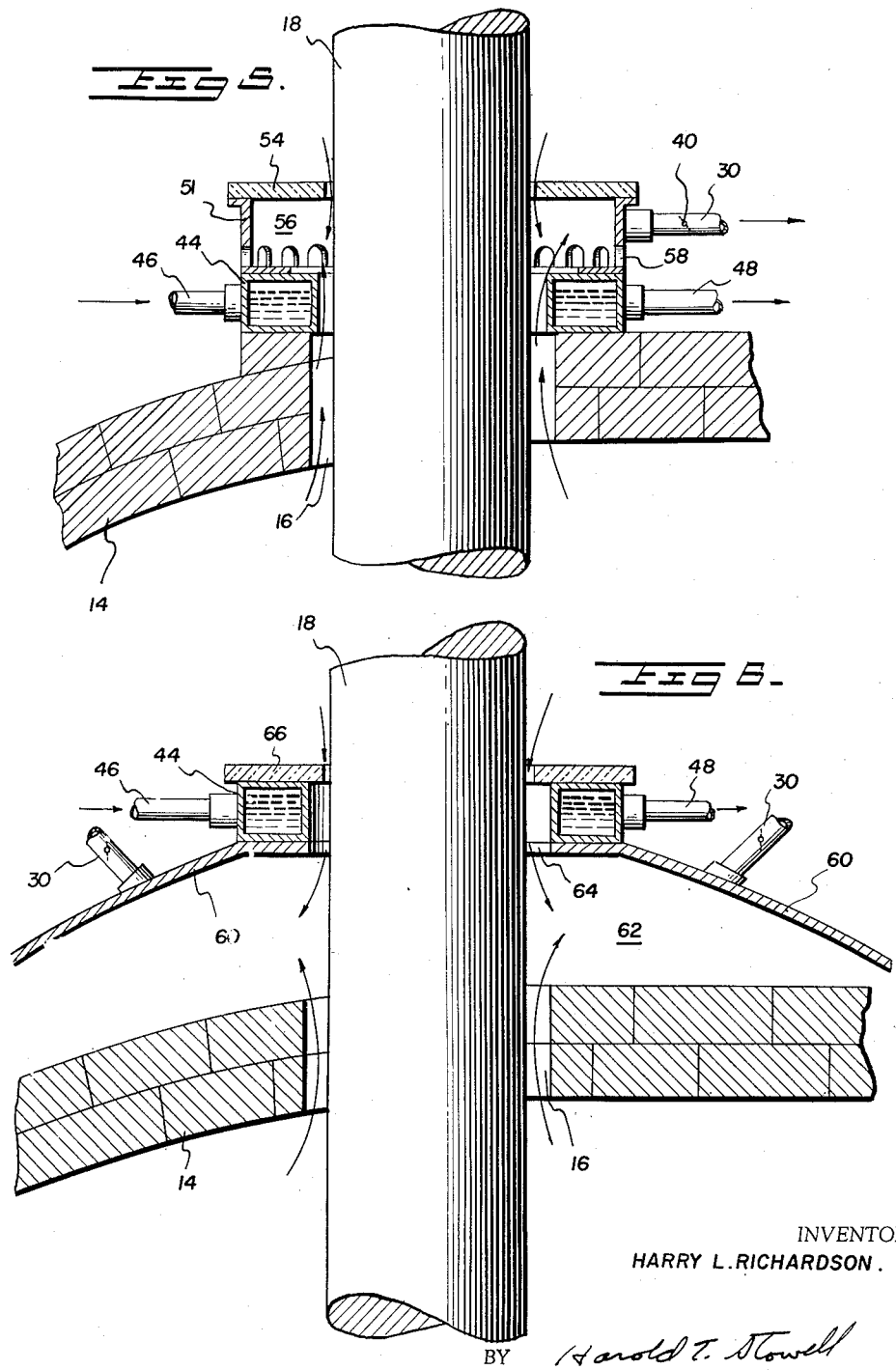

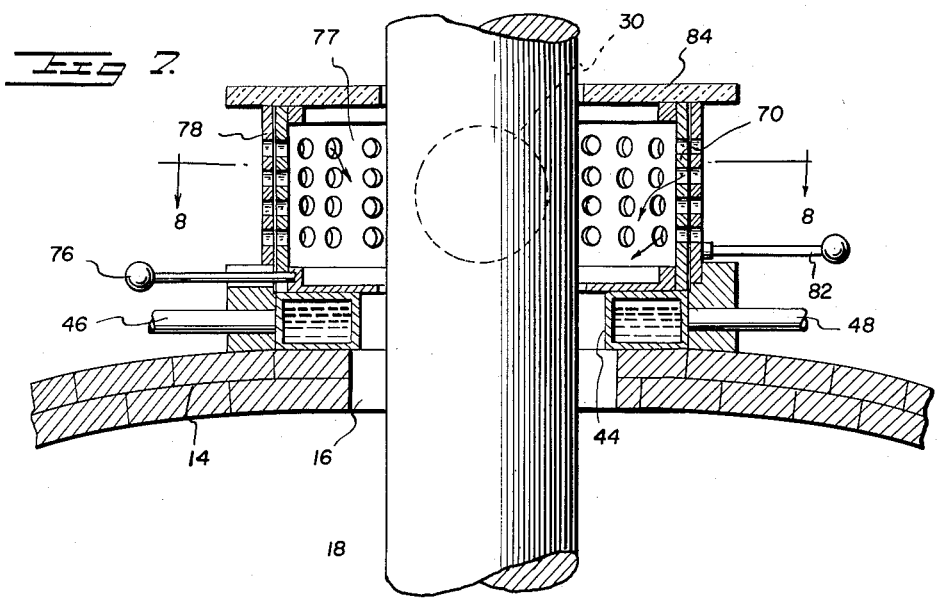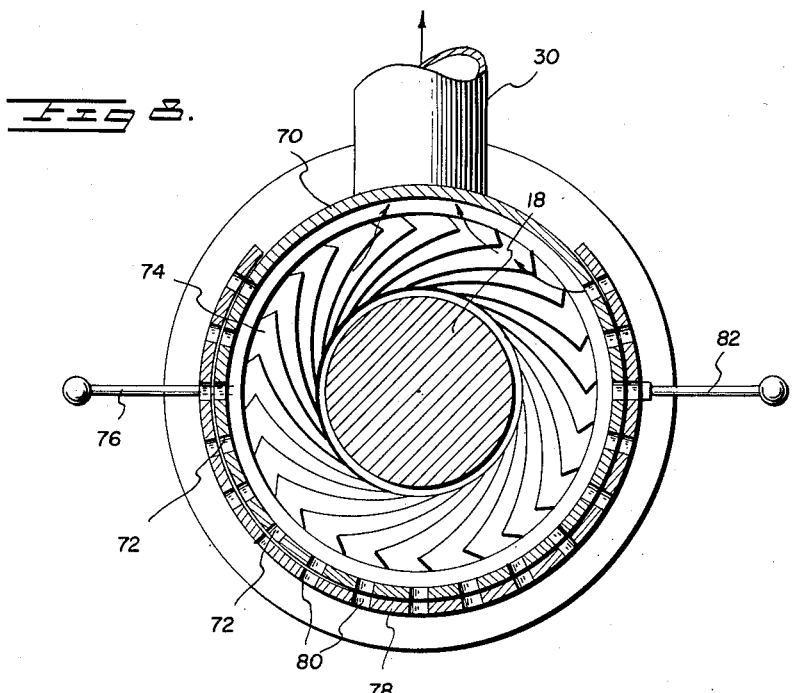

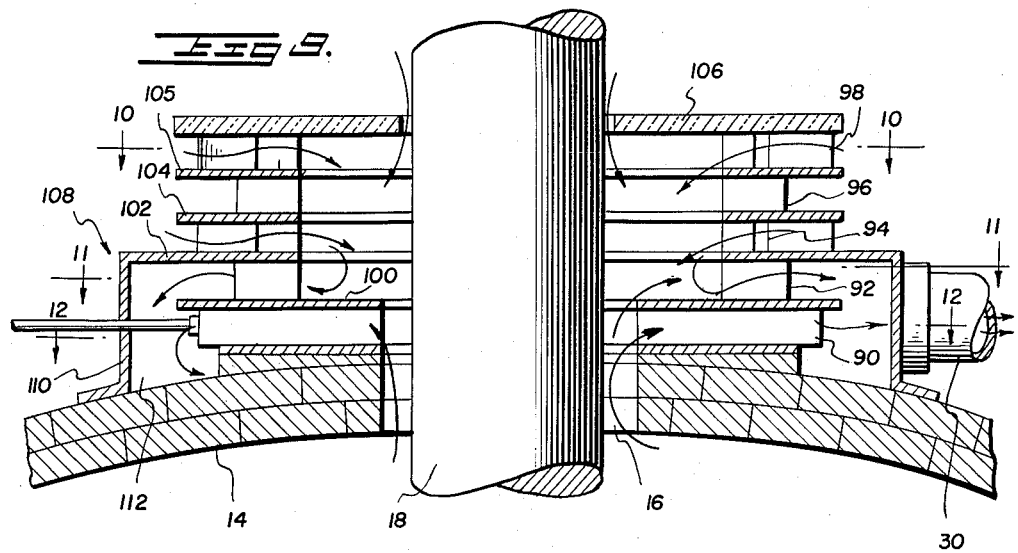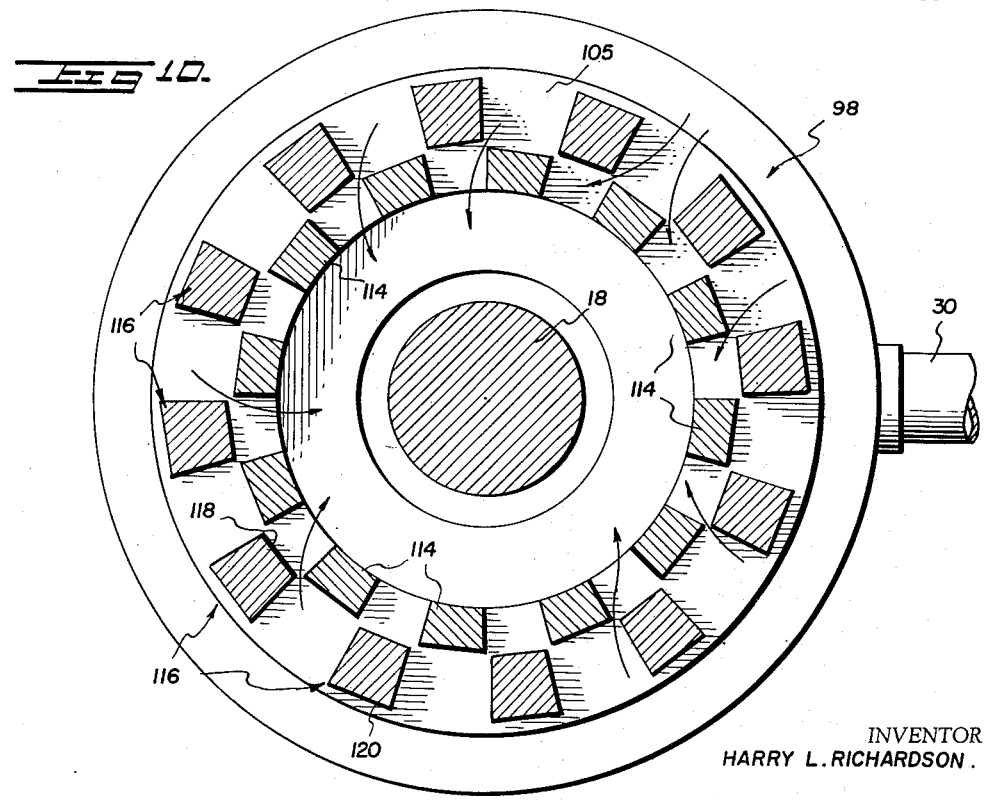

Aug. 28, 1956  H. L. RICHARDSON  2,761,003
APPARATUS FOR REMOVING GASES FROM AN ARC FURNACE
Filed April 9, 1954  6 Sheets-Sheet 6
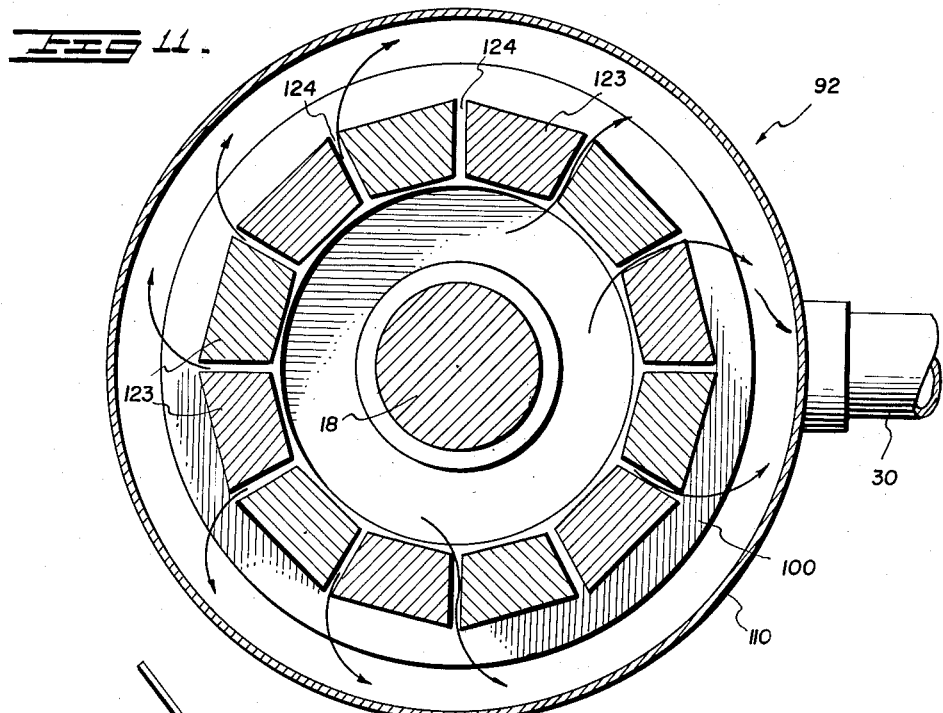
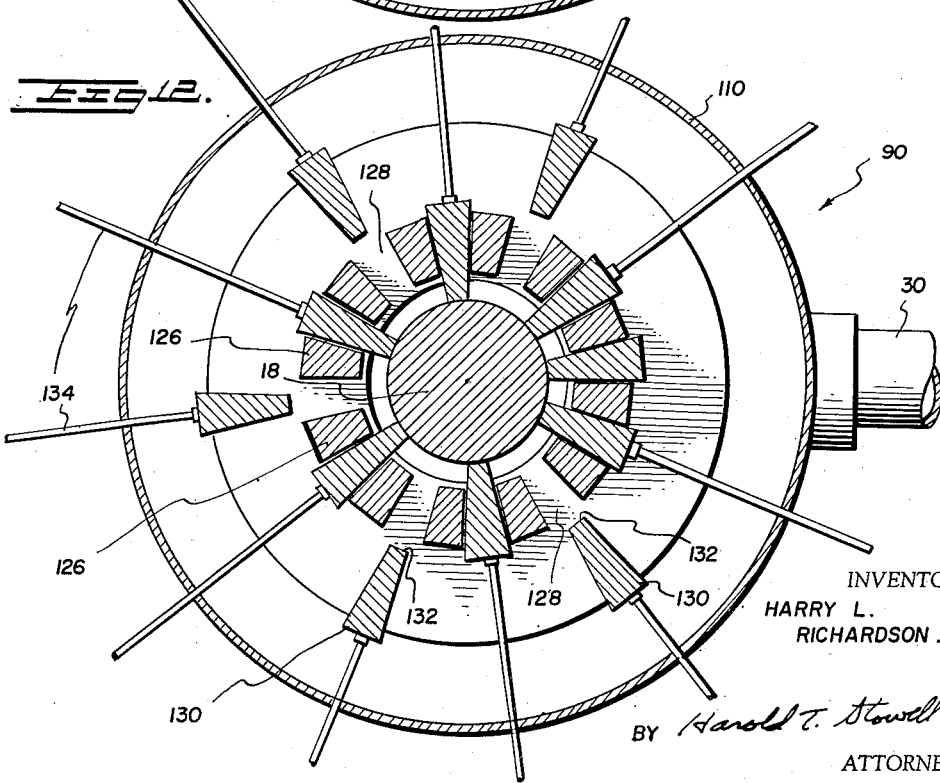
INVENTOR
HARRY L. RICHARDSON.
BY Harold T. Stowell
ATTORNEY … # 2,761,003
Patented Aug. 28, 1956

2,761,003

APPARATUS FOR REMOVING GASES FROM AN ARC FURNACE

Harry L. Richardson, Pittsburgh, Pa., assignor to Research Corporation, New York, N. Y., a corporation of New York Application April 9, 1954, Serial No. 422,198

8 Claims. (Cl. 13—9)

This invention relates to a method and apparatus for collecting suspended particles from gases and in particular to gases escaping from the interior of electric furnaces employed in metallurgical industries.

The problem of the subsequent handling of dust and fume in electric furnace operation is a very acute problem in the industry. This is particularly true today as more and more communities are adopting strict atmospheric antipollution programs.

The use of large hoods suspended above electric furnaces to maintain an adequate indraft of air over and around the dust emitting portions of the furnaces have been used with some success. However, many objections to the use of hoods for collecting electric furnace fume have been found in addition to that brought about by the large quantities of mixed air and furnace gases which must be treated when open hoods are used.

Some of these additional objections are:

1. The interference with accessibility to the furnace electrodes, which need constant inspection;

2. The inability of a hood located over the furnace roof to completely control the fume escaping not only from the roof but from charging or similar doors and vents in the furnace walls;

3. The high initial expense of hooding electric furnaces due to the nature of materials of construction required to meet the high temperature conditions and the corrosive nature of the fume often encountered in electric melting furnaces; and 4. The inadequacy of hooded type gas collectors on electric furnaces which rock or roll to discharge.

It is, therefore, a primary object of the invention to provide fume control means for electric metallurgical furnaces which will very satisfactorily collect the large fume losses, which may be as high as .5 to more than 1.0% of the process weight.

Another object is to provide a gas and fume drawoff system wherein the internal gas pressure of the furnace is controlled. (Some electrical furnace operations require an internal pressure of about 0.1 to about 0.6 inch, others atmospheric, and still others, a slight negative pressure.)

A further object is to provide such a device that will not interfere with the electrodes which often must be replaced as frequently as every 2 hours during furnace operation.

A further object is to provide such a device which will not increase the carbon consumption of the electrodes nor shorten the life of the furnace roof.

Another object is to provide such a method and apparatus which may be used on stationary or tilting type electric furnaces.

A further object is to provide means whereby fume escaping from charging or similar door and vents may be very adequately controlled.

Further objects are to provide such an apparatus that is relatively inexpensive to construct, simple as to its parts and requires very little individual inspection and attention other than that which is ordinarily required of present roof structures of the furnaces.

A further object is to provide means for collecting fume from electric furnaces whereby the volume of gases collected for subsequent handling is kept to a minimum.

These and other objects and advantages are provided by the apparatus of the invention for collecting fume from electric furnaces including a roof and at least one electrode extending through a hole therein which comprises means for disposing of fume escaping from the interior of the furnace including means forming a collar around the electrode exteriorly of the roof and cooperating with the roof to define a plenum chamber with which the opening between the roof and the electrode communicates, an ambient air inlet into the plenum chamber, fume disposal means, conduit means connecting the plenum chamber with the fume disposal means, and means communicating with the conduit means maintaining a controlled pressure in the plenum chamber less than the ambient air pressure; and by the method of disposing of fume escaping from the interior of electric furnaces having a roof with at least one electrode extending through an opening therein comprising the steps withdrawing fume from the opening between the electrode and the roof of the furnace, mixing the fume so withdrawn with a predetermined portion of ambient air adjacent the point of withdrawal by maintaining a pressure adjacent the roof opening less than the ambient air pressure, and transporting the gases to fume disposing means at a point remote from the furnace.

The invention will be more particularly described with reference to the illustrating embodiments thereof wherein:

Figure 1 is an elevational view of an electrical furnace and an electrical precipitator constructed in accordance with the teachings of the invention;

Figure 2 is a top plan view of the electric furnace shown in Figure 1;

Figure 3 is a fragmentary sectional view substantially on line 3—3 of Figure 2;

Figure 4 is a fragmentary elevational sectional view of one of the access doors of the furnace shown in Figure 2;

Figure 5 is a fragmentary vertical sectional view similar to that shown in Figure 3 of a modified form of the invention.

Figure 6 is a fragmentary elevational view of another form of the invention;

Figure 7 is a fragmentary vertical sectional view of another form of the fume collecting means of the invention;

Figure 8 is a section substantially on line 8—8 of Figure 7;

Figure 9 is a fragmentary vertical sectional view of still another modification of the fume collecting means of the invention;

Fig. 10 is a section substantially on line 10—10 of Figure 9;

Figure 11 is a section substantially on line 11—11 of Figure 9; and

Figure 12 is a section substantially on line 12—12 of Figure 9.

Referring to the drawing and particularly to Figures 1 and 2 thereof, 10 generally designates an electric furnace of the type frequently used in the metallurgical industry to melt and refine steel or iron, having a body portion 12 adapted to hold the charge to be melted or treated and a roof 14. The roof and the body of the furnace are preferably constructed of fire brick as well known in the art.

In the roof 14 of the furnace are three openings 16 through each of which extends a carbon electrode 18. Projecting outwardly from the sides of the furnace are two furnace access doors 20. The openings as more clearly shown in Figure 4 are provided with vertically movable closure panels 22.

The openings about the electrodes and about the furnace doors are the primary sources of fume from the conventional electric furnace. On large electric furnaces, which may be rated from 50 to 200 or more tons per heat, each of the electrodes may be 2' or more in diameter, and it has been found that the fume losses about the electrode openings in the roof may be as high as 0.5 to 1.0% or more of the process weight.

It has also been found that very satisfactory collection of the fume may be obtained by placing a fume collecting collar 24 about each of the electrodes and connecting the collar to any suitable fume disposal means which is shown by way of example as an electrical precipitator 26 by means of conduits 28 and feeder ducts 30. In order to insure that the pressure within the collar 24 is less than the ambient air pressure, a fan or the like generally designated 32 may be positioned between the furnace and the gas disposal means or on the exhaust side of the gas disposal means.

Other feeder ducts 34 connect hoods 36, one of which is shown in Figure 4, to the conduit 28 for collecting fume escaping from the furnace doors.

In each of the feeder ducts 30 and 34 and in the main conduit 28 valves or dampers generally indicated 38, 40 and 42, respectively, may be provided for controlling the passage of fume and gases therethrough. For example, the valves 38 in the ducts 34 may be closed except during the period when the access doors 22 are in the open position.

Referring in particular to Figure 3 of the drawings, details of the fume collecting and mixing collar 24 is shown. The hood or collar 24 is supported on an annulus 44 which in turn is supported by the roof of the furnace 14 about the electrode opening 16. Inlet and outlet ducts 46 and 48 connect the annulus 44 with a source of cooling fluid such as water, not shown in the drawings. The circulation of the cooling liquid through the annulus 44 lowers the temperature of the fume containing gases issuing from the opening in the furnace and cools the collar 24 to such a temperature which will permit the use of metal fume collecting rings and piping.

The fume collecting collar 24 as hereinbefore set forth is supported on top of the cooling annulus 44 and surrounds the electrode 18. However, a suitable clearance space 50 at the upper end of the collar 24 is maintained to permit the insertion of new carbons and an inflow of air into the plenum chamber formed by the collar 24, the electrode 18 and the roof structure of the furnace. Additional air inlets 52 are provided in the sides of the collar 24 to permit the ingress of additional outside air into the plenum chamber.

In operation of this form of the invention, a negative pressure or a pressure less than the ambient air pressure is created by, for example, the blower or fan 32 which draws the fume from the furnace past the cooling annulus 44 where the temperature of the gases are lowered and into the plenum chamber where the fume is mixed with outside air entering the inlets 50 and 52 where a further reduction of the gas temperature is affected.

With the gases issuing from the furnace at a temperature of, for example, 1900° F., dilution thereof in the order of about 10% by outside air will be required in order to lower the temperature to a point where the gases may be conveniently handled in conventional manner. The mixed fume and outside air is then drawn through the feeder ducts 30, the conduit 28 and to suitable dust cleaning equipment or a discharge point.

In Figure 5 of the drawings a modified form of the invention is shown, however, due to the substantial similarity between fume collecting means of Figures 3 and 5, identical parts are provided with identical reference numerals. In the Figure 5, the collar 52 is in the form of a metallic ring supported at its lower end by the cooling annulus 44. A ceramic plate 54 encircles and insulates the electrode 18 and is supported by the upper peripheral edge of the ring 51 and cooperates therewith to form a plenum chamber 56.

A duct 30 connects the upper portion of ring 51 to the gas disposal means as described in reference to Figures 1 through 3. In operation of this form of the invention, fume issuing from the opening between the electrode 18 and the roof structure 14 enters the plenum chamber 56 after flowing past the cooling annulus 44. In the plenum chamber, ambient air entering from openings 58 and from between the ceramic cover 54 and the electrode 18 mixed with the fume lowering its temperature to a point where the fume may be handled in a convenient manner.

In Figure 6 another form of the invention is shown wherein a single casing 60 is provided over the entire roof portion 14 of the electric furnace. The metallic cover 60 as shown in the drawings is spaced from the upper surface of the furnace roof to provide a single plenum chamber 62 defined by the outer surface of the roof 14 and the inner surface of the plate 60. An opening 64 slightly larger than the diameter of the electrode 18 is provided in the plate 60 in alignment with each of the electrode openings 16 in the roof structure 14. A cooling annulus 44 having cooling inlet pipe 46 and outlet pipe 48 is supported by the plate 60 about each of the electrode openings 64. A ceramic or other heat and electrical insulating plate 66 is carried at the upper end of annulus 44 and restricts the area of the inlet opening for ambient air into the plenum chamber 62.

A plurality of ducts 30, for example, two adjacent each of the furnace electrodes 18 connect the plenum chamber 62 to the gas transport apparatus.

In operation of this form of the invention conduits 30 maintain a pressure in the plenum chamber 62 less than the ambient air pressure whereby fume issuing from the opening 16 and air drawn in between the ceramic collars 66 and the electrodes 18 are intermixed and conveyed to the fume disposal means. The cooling effect of the cooling annulus 44 permits the use of metallic conduits at 46 and 48 and the metallic cover plate 60.

In Figures 7 and 8 of the drawings, fume collecting and cooling means are shown wherein the amount of both the outside air drawn into the plenum chamber and of the fume from the furnace entering from about the electrode opening 16 are positively controlled. In Figures 7 and 8 a vertically extending ring 70 is supported on cooling annulus 44 carried by the roof 14 of the furnace about the electrode opening 16. The ring 70 has a plurality of air inlet openings 72 therein and an opening into which the outlet duct 30 is connected. At the lower end of the perforate ring 70 is attached a horizontally extending iris type diaphragm member 74, having a control handle 76 for regulating the flow of fume from the opening 16 into the plenum chamber 77. About the portion of the ring 70, having the air inlet openings 72, is rotatably mounted a second vertically extending ring segment 78 having openings 80 therethrough corresponding to the opening 72 in the ring 70. A horizontally extending handle member 82 is secured to the member 78 whereby the flow of ambient air through complementary openings 80 and 72 may be controlled.

An insulating plate member 84 is supported at the upper end of ring 72 and forms the roof of the plenum chamber 78.

In Figures 9 through 12 of the drawings, is another form of the invention showing means for controlling the flow of both the fume from the furnace and the ambient air to the gas cleaning apparatus. In Figure 9 it will be seen that this form of the invention is constructed from five superimposed layers or courses of brick designated generally 90, 92, 94, 96 and 98 having spacer plates 100, 102, 104 and 105 therebetween while a cover plate 106 is supported by the uppermost brick course 98.

The spacer plate 102 forms the horizontal portion of an L-shaped ring 108 supported at its lower end from the roof of the furnace 14. The duct 30 which directs the fume and air mixture to the gas transport apparatus is connected to the vertical portion 110 of this L-shaped ring 108.

Brick courses 94 and 98 are identical in structure and comprise the means for controlling the inflow of ambient air into the fume collector, therefore, only brick course 98 will be described in detail in reference to Figure 10 of the drawings.

Brick course 98 comprises a plurality of spaced bricks 114 having tapered sides positioned concentrically about the electrode 18. The bricks 114 are secured to the roof 106 and the lower spacer plate 105 to prevent their movement relative to these members. A plurality of bricks 116, one for each of the openings between bricks 114, are slidably mounted on the plate 105. The bricks 116 are preferably constructed with the width of the faces 118 slightly less than the width of the spacing between the rearward ends of the fixed bricks 114 while the rearward ends 120 are slightly greater than these openings. By merely sliding the bricks 116 toward or away from the spaces between the fixed blocks or bricks 114, the area of the openings is effectively controlled.

Brick course 96 comprises a complete ring concentric with the electrode 18 and is not therefore shown in plan view.

Brick course 92 is shown in plan in Figure 11 and comprises a plurality of wedge shaped bricks 122 formed into a ring concentric with electrode 18 and having limited openings 124 between each of the bricks. The openings 124 communicate with the space between the brick course and the electrode and plenum chamber 112, whereby the ambient air entering the openings between the fixed and movable bricks in brick courses 94 and 98 and a portion of the fume issuing from the electrode opening 16 and the roof 14 may be drawn into the plenum chamber.

Brick course 90 shown in plan view in Figure 12 also provides for the passage of fume, issuing from the opening 16, into the plenum chamber 112, and further provides means for controlling such flow of fume.

Brick course 90 is similar to brick courses 94 and 98 hereinbefore described and comprises a plurality of fixed wedge shaped bricks 126 spaced from each other to form a ring about the electrode 18 and having a plurality of fume passages 128 therebetween. Brick course 90 also includes a plurality of wedge shaped slidably mounted bricks 130 which are so shaped that they will completely close the openings 128 when their inner faces 132 are in contact with the surface of the electrode 18.

Each of the sliding brick 130 has attached to its rear face a push rod 134 which extends through a close fitting opening in the vertical wall portion 110 of the metallic L-shaped member 108. It will be seen that the push rods 134 permit positive control of the fume passing through the openings 128 and also through the openings 124 in brick course 92 without disturbing the assembly.

In operation of this form of the invention, the slidable bricks 130 are positioned adjacent the openings 128 between fixed bricks 126 so that the pressure within the electric furnace may be maintained relatively constant. Similarly the sliding blocks or bricks in brick courses 94 and 98 are positioned adjacent their complementary openings to control the amount of air to be mixed with fume whereby the temperature of the gas to be treated is maintained at a temperature which will permit handling in conventional gas disposal means.

From the foregoing description, it will be seen that the new fume collecting means for electric furnaces fully accomplish the aforementioned aims, objects and advantages of the invention. It will also be apparent that modifications may be made in the form of the invention without departing from the scope of the invention as defined in the appended claims. For example, while the drawings show a fixed type electric furnace, it will be evident that the fume collecting means may also be employed on electric furnaces of the type which rock or tilt to discharge their finished product. When the invention is so employed, the connection between feeder ducts 30 and the primary conduit 28 would be a fluid tight flexible coupling to permit relative movement between the furnace and the conduit 28.

I claim:

1. In an electric furnace including a roof and at least one electrode extending through a hole in said roof, means for disposing of fume escaping from the interior of the furnace comprising, means forming a collar around said electrode exteriorly of the roof and cooperating with the roof to define a plenum chamber with which the opening between the roof and the electrode communicates, an ambient air inlet into said chamber between said collar and said electrode, fume disposal means, conduit means connecting said chamber with said fume disposal means, and means communicating with said conduit means maintaining a pressure in said chamber less than the ambient air pressure.

2. The invention as defined in claim 1 including an annulus in contacting relationship with said plenum chamber, and inlet and outlet means in said annulus for passing a cooling medium therethrough.

3. In an electric furnace including a roof and at least one electrode extending through a hole in said roof, means for disposing of fume escaping from the interior of the furnace comprising an annulus supported by the roof and around the electrode, inlet and outlet means in said annulus for passing a cooling medium therethrough, a generally vertically extending ring supported by said annulus and forming a collar about a portion of the electrode exteriorly of the furnace roof and having a plurality of openings in the side wall thereof, an insulating cover for said ring cooperating with the ring and the annulus to define a plenum chamber with which the opening between the roof and the electrode communicates, an ambient air inlet to said chamber between said cover and said electrode fume disposal means, conduit means connecting said plenum chamber with the fume disposal means, and means communicating with said conduit means maintaining a pressure in said chamber less than the ambient air pressure.

4. In an electric furnace including a roof and at least one electrode extending through a hole in said roof, means for disposing of fume escaping from the interior of the furnace comprising a generally vertically extending ring supported by the roof and forming a collar about a portion of the electrode exteriorly of the furnace roof and having a plurality of openings in the side wall thereof for the passage of ambient air, a rotatable sleeve about the portion of the ring having the ambient air openings and having complementary openings in the side wall thereof, an insulating cover for said ring cooperating therewith to define a plenum chamber with which the opening between the roof and the electrode and the opening in the wall of the ring communicate, second ambient air inlets into the plenum chamber between said electrode fume disposal means, conduit means connecting said plenum chamber with the fume disposal means, means communicating with said conduit means maintaining a pressure in said chamber less than the ambient air pressure, and valve means between the chamber and the opening between the roof and the electrode.

5. In an electric furnace including a roof and at least one electrode extending through a hole in said roof, means for disposing of fume escaping from the interior of the furnace comprising means forming a collar around the electrode exteriorly of the roof and cooperating therewith to form a plenum chamber, first valve means connecting the plenum chamber with the opening between the roof and the electrode, second valve means connecting the ambient air with the plenum chamber, fume disposal means, conduit means connecting said plenum chamber with said fume disposal means, means communicating with said conduit means maintaining a pressure in said chamber less than the ambient air pressure, and a cover for said collar having second ambient air inlets into said plenum chamber between said cover and the electrode.

6. The invention as defined in claim 5 wherein said first and second valve means comprise a plurality of spaced blocks secured about the electrode and a plurality of complementary movable blocks positioned adjacent the openings between the spaced blocks whereby the passage of ambient air and fume therethrough may be controlled within wide limits.

7. The invention as defined in claim 1 including second ambient air inlets into said chamber.

8. The invention as defined in claim 7 wherein said second ambient air inlets comprise a plurality of inlet openings in the sides of said collar.

References Cited in the file of this patent

UNITED STATES PATENTS

| | | |
|---|---|---|
| 594,740 | Hartenstein | Nov. 30, 1897 |
| 993,105 | Reid | May 23, 1911 |
| 1,338,103 | Shipton | Apr. 27, 1920 |
| 1,499,020 | Leonarz | June 24, 1924 |
| 2,303,973 | Armstrong | Dec. 1, 1942 |
| 2,672,491 | Lamb | Mar. 16, 1954 |

OTHER REFERENCES

Ser. No. 416,888, Michelat (A. P. C.), published June 15, 1943.